United States Patent
Kim et al.

(10) Patent No.: US 9,423,425 B2
(45) Date of Patent: Aug. 23, 2016

(54) SIDE-CHANNEL ANALYSIS APPARATUS AND METHOD BASED ON PROFILE

(71) Applicant: Electronics and Telecommunications Research Institute, Daejeon (KR)

(72) Inventors: Ju Han Kim, Daejeon (KR); Kyunghee Oh, Daejeon (KR); Doo Ho Choi, Daejeon (KR); Taesung Kim, Daejeon (KR); Yong-Je Choi, Daejeon (KR); Seung Kwang Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 709 days.

(21) Appl. No.: 13/734,695

(22) Filed: Jan. 4, 2013

(65) Prior Publication Data

US 2013/0325382 A1     Dec. 5, 2013

(30) Foreign Application Priority Data

May 31, 2012  (KR) ......................... 10-2012-0058684

(51) Int. Cl.
  *G01R 13/00* (2006.01)
  *G06F 17/00* (2006.01)
  *G01R 13/02* (2006.01)
  *H04L 9/00* (2006.01)

(52) U.S. Cl.
  CPC .............. *G01R 13/00* (2013.01); *G01R 13/029* (2013.01); *G06F 17/00* (2013.01); *H04L 9/002* (2013.01)

(58) Field of Classification Search
  USPC ........................................................ 702/66
  See application file for complete search history.

(56) References Cited

U.S. PATENT DOCUMENTS

2002/0124178 A1   9/2002   Kocher et al.
2011/0228926 A1   9/2011   Shumow et al.

FOREIGN PATENT DOCUMENTS

KR    10-2008-0047022 A    5/2008

OTHER PUBLICATIONS

Kaiyan Chen, The Power of Electromagnetic Analysis on Embedded Cryptographic Ics (The 2008 International Conference on Embedded Software and Systems Symposia (ICESS2008), pp. 197-201.*
Shaohua Tang, Power Analysis Attacks against FPGA Implementations of KLEIN, printed on Sep. 15, 2015, pp. 1-12.*
Guo-liang Ding in Cryptanalysis for Embedded Systems based on Electromagnetism Emission, 2008 IEEE, pp. 1021-1024.*
Juhan Kim et al., "SCARF: profile-based Side-Channel Analysis Resistant Framework", Proceedings of the 2012 International Conference on Security & Management, Jul. 16-19, 2012, WORLDCOMP'12, Las Vegas Nevada, USA.

* cited by examiner

*Primary Examiner* — Tung S Lau

(57) ABSTRACT

A side channel analysis apparatus based on a profile includes a waveform collection unit configured to collect leaked information from a target device of a side channel analysis; and a preprocessing unit configured to preprocess a waveform data correspond to the leaked information collected from the waveform collection unit before analyzing same. Further, the side channel analysis apparatus includes an analysis unit configured to analyze the waveform data preprocessed in the preprocessing unit; and a profile configuration unit configured to make each process of the waveform collection unit, the preprocessing unit, and the analysis unit into a process and configure a profile for managing each process by connection of each process.

4 Claims, 5 Drawing Sheets

SIDE-CHANNEL ANALYSIS APPARATUS AND METHOD BASED ON PROFILE

CROSS-REFERENCE TO RELATED APPLICATION(S)

The present invention claims priority of Korean Patent Application No. 10-2012-0058684, filed on May 31, 2012, which is incorporated herein by reference.

FIELD OF THE INVENTION

The present invention relates to a side channel analysis; and more particularly to a side channel analysis apparatus and method based on a profile, which are capable of making all processes of the side channel analysis of collecting a waveform, preprocessing, and analyzing and the like easily understood through referring to the profile.

BACKGROUND OF THE INVENTION

Typically, side channel analysis is a technology finding a key of a cryptographic module by collecting, preprocessing, analyzing waveforms of power, electromagnetic waves and the like generated when the cryptographic module of an apparatus to be analyzed is operated through a waveform collection device such as an oscilloscope.

Further, a current side channel analysis system mainly performs the side channel analysis by the waveform. In process of collecting, preprocessing, and analyzing the waveform, whenever each process progresses, each process exports results thereof in a waveform. However, if only a result waveform of each process is provided, what relationship exists between the result waveforms, whether the result waveform is generated in any order, and what parameters have been used in each process may not be clearly known.

For example, the waveform is collected and stored through a waveform collection device, but it is difficult to know, by viewing the stored waveform, what waveform collection device is used, what sampling speed is applied, and what protocol is used to store the waveform and the like. Further, when the waveform is preprocessed several times, it is difficult to know, by only viewing the stored several waveforms, what waveform is preprocessed through which preprocessing and what parameter values are used in the preprocessing. Therefore, it is difficult to instruct know-how of analysis.

SUMMARY OF THE INVENTION

In view of the above, the present invention provides side channel analysis apparatus and method based on a profile, which are capable of making all processes of a side channel analysis of collecting a waveform, preprocessing, and analyzing and the like easily understood through referring to the profile by making each process of the side channel analysis through collecting waveform, preprocessing, and analyzing into a process in a side channel analysis system, making a profile for managing each process by connection of each process, thus enabling a parameter used in each process and each waveform of operation result of each process to be easily confirmed.

In accordance with a first aspect of the present invention, there is provided a side channel analysis apparatus based on a profile, including: a waveform collection unit configured to collect leaked information from a target device of a side channel analysis; a preprocessing unit configured to preprocess a waveform data correspond to the leaked information collected from the waveform collection unit before analyzing same; an analysis unit configured to analyze the waveform data preprocessed in the preprocessing unit; and a profile configuration unit configured to make each process of the waveform collection unit, the preprocessing unit, and the analysis unit into a process and make a profile for managing each process by connection of each process.

Further, the profile configuration unit may make a side channel analysis task about the target device of the side channel analysis into one project, make a plurality of profiles in a lower level of the project, and make a waveform collection process, preprocessing processes, and analysis processes in a lower level of each process to connect each other.

Further, the profile configuration unit may display parameters used in each process, and drives each process by the parameters.

Further, the process may receive a waveform of a previous process to generate a new waveform, and input the new generated waveform to a subsequent process.

In accordance with a second aspect of the present invention, there is provided a method for analyzing a side channel based on a profile. The method includes collecting a waveform by collecting leaked information from a target device of the side channel analysis; preprocessing a waveform data corresponding to the leaked information collected from the waveform collection unit before analyzing the waveform; analyzing the waveform data preprocessed in the preprocessing unit; and making each of said collecting a waveform, preprocessing a waveform data, and analyzing the waveform data into a process to make a profile.

Further, said making a profile may include making a side channel analysis task about the target device of the side channel analysis into one project about the side channel analysis target equipment; making a plurality of profiles in a lower level of the project; and making a waveform collection process, preprocessing processes, and analysis processes in a lower level of each profile to connect each other.

Further, said making a profile may be performed such that parameters used in each process are displayed, and each process is driven by the parameters.

Further, the process may receive the waveform of a previous process to generate a new waveform, and input the new generated waveform to a subsequent process.

In accordance with the present invention, it is possible to make all processes of a side channel analysis of collecting, preprocessing, analyzing a waveform and the like easily understood through referring to the profile by making each process of the side channel analysis into a process through collecting, preprocessing, and analyzing a waveform in a side channel analysis system, making a profile for managing each process by connection of each process, thus enabling a parameter used in each process and each waveform of operation result of each process to be easily confirmed.

Further, if an analysis method for the side channel analysis of one apparatus to be analyzed is instructed to a side channel certification authority by making a profile, each side channel certification authority may easily understand the method for the side channel analysis of the device through the profile. At this time, if the profile is initialized, the result waveform of each process is reset. Thereafter, if the profile is driven by connecting the waveform collection device with the device to be analyzed, the same result as that of the instructed certification authority may be obtained. Therefore, know-how of the analysis may be easily instructed.

BRIEF DESCRIPTION OF THE DRAWINGS

The objects and features of the present invention will become apparent from the following description of embodiments given in conjunction with the accompanying drawings, in which.

DETAILED DESCRIPTION OF THE EMBODIMENTS

Hereinafter, embodiments of the present invention will be described in detail with reference to the accompanying drawings which form a part hereof.

In the following description of the present invention, if the detailed description of the already known structure and operation may confuse the subject matter of the present invention, the detailed description thereof will be omitted. The following terms are terminologies defined by considering functions in the embodiments of the present invention and may be changed operators intend for the invention and practice. Hence, the terms need to be defined throughout the description of the present invention.

Figure 1:
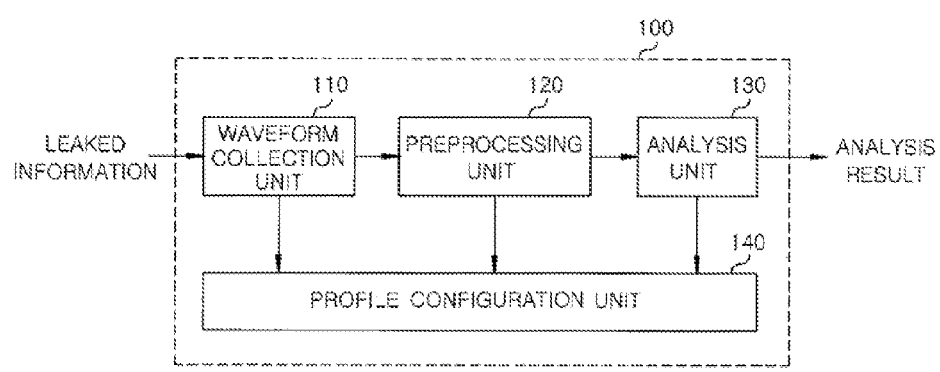
FIG. 1 is a detailed block diagram showing a side channel analysis apparatus based on a profile in accordance with an embodiment of the present invention.

FIG. 1 is a detailed block diagram showing a side channel analysis apparatus 100 based on a profile, and may include a waveform collection unit 110, a preprocessing unit 120, an analysis unit 130, and a profile configuration unit 140 in accordance with an embodiment of the present invention.

Hereinafter, the operation in each unit of the side channel analysis apparatus 100 of the present invention will be described in detail with reference to FIG. 1.

First, the waveform collection unit 110 may include an external measuring device for collecting leaked information (e.g., power consumption, electromagnetic wave and the like) leaked from electronic security equipment which is target of side channel analysis and an oscilloscope connected thereto. In other words, the waveform collection unit 110 may be configured to measure the leaked information using the external measuring device and to collect waveform data through the oscilloscope.

The preprocessing unit 120 may receive at least part of waveform data collected by the waveform collection unit 110 to preprocess the received waveform data for easy analysis. The analysis unit 130 may generate a result of the side channel analysis on the waveform data to be analyzed which is preprocessed by the preprocessing unit 120.

At this time, the waveform collection unit 110, the preprocessing unit 120, and the analysis unit 130 may have a configuration of being operated independently and in parallel. In other words, each unit of the side channel analysis apparatus 100 shown in FIG. 1 in accordance with the present invention may be implemented by a computer program including multi-processor multi-thread capable of performing functions described above in parallel and a computer device capable of driving the computer program.

The profile configuration unit 140 may make each process of collecting waveform, preprocessing, and analyzing, which is performed in each of the waveform collection unit 110, the preprocessing unit 120, the analysis unit 130 and the like into a process, and may make a profile for managing each process by connection of each process. Specifically, the profile configuration unit 140 makes a side channel analysis task about the target device of the side channel analysis into one project, makes a plurality of profiles in a lower level of the project, and makes a waveform collection process, preprocessing processes, and analysis processes in a lower level of each process to connect each other. At this time, each process may have each parameter, and each process may be driven by setting these parameters. Each process receives and processes a waveform of previous process to generate a different waveform, and transmits the generated waveform to subsequent process.

Therefore, the flow of the processes from collecting to analyzing the waveform may clearly be seen, and the parameters of each process may be easily understood. Further, the waveform which is the result of operation of each process may be easily seen. Therefore, anyone may clearly understand a method for collecting, preprocessing and analyzing of the waveform if only to see the profile.

Hereinafter, an operation of the profile configuration unit 140 will be described in detail referring to FIGS. 2 to 5.

Figure 2:
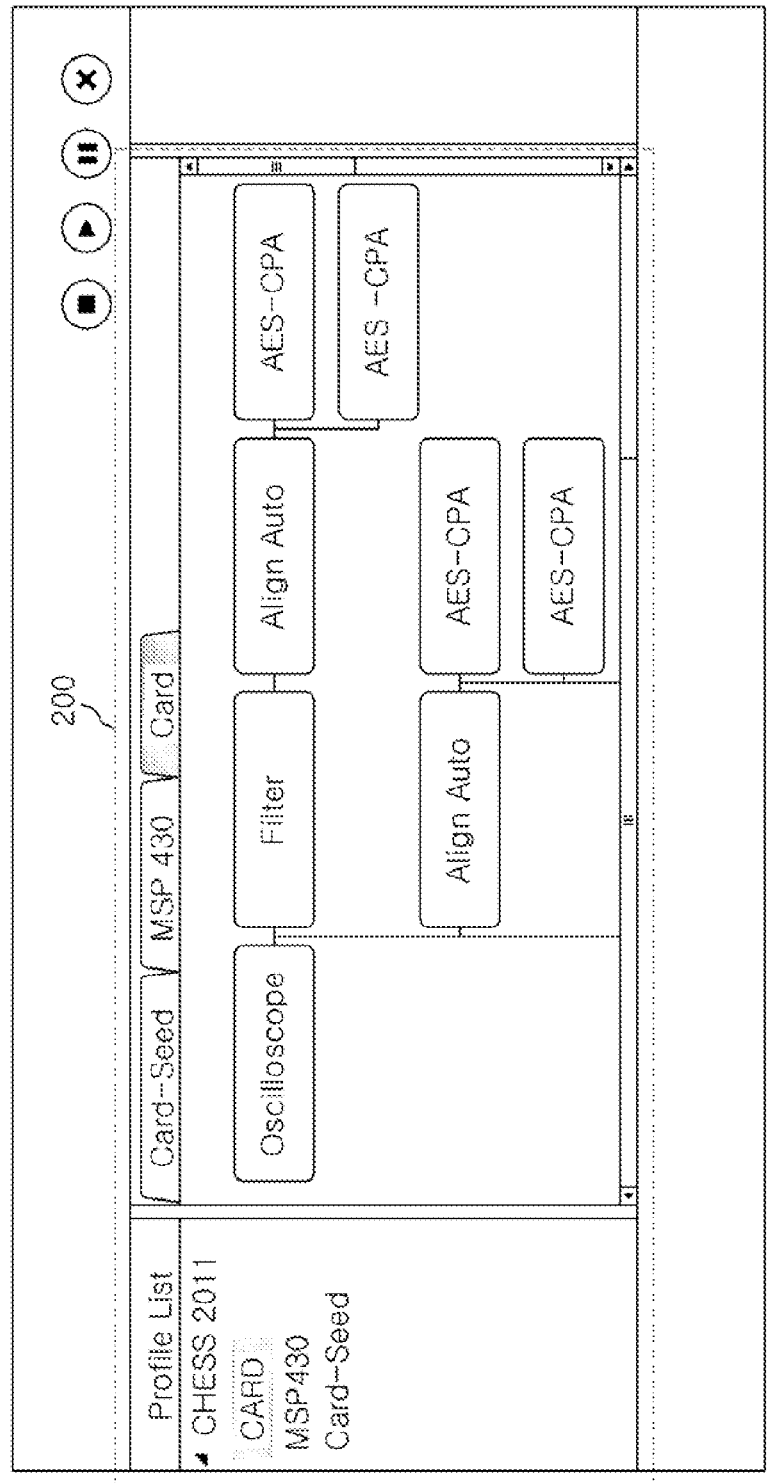
FIG. 2 is an exemplary diagram showing the configuration of a profile in accordance with the embodiment of the present invention.

Referring to FIG. 2, inside a box marked with the reference number 200 is one profile.

A profile called 'Card' is included in project 'CHES2011'. The start process of the 'Card' profile is a process of collecting a waveform in the waveform collection unit 110 using the oscilloscope.

Thereafter, it may be seen that several preprocessing processes and analysis processes are connected. The connection between each process may be made by dragging and dropping each process in a process list of left box marked with the reference number 300 shown in FIG. 3. Further, if each process is clicked, parameters of each process appear in a property editor window (Property Editor) of right box marked with the reference number 302 shown in FIG. 3, and the value of the parameters may be set.

Figure 3:
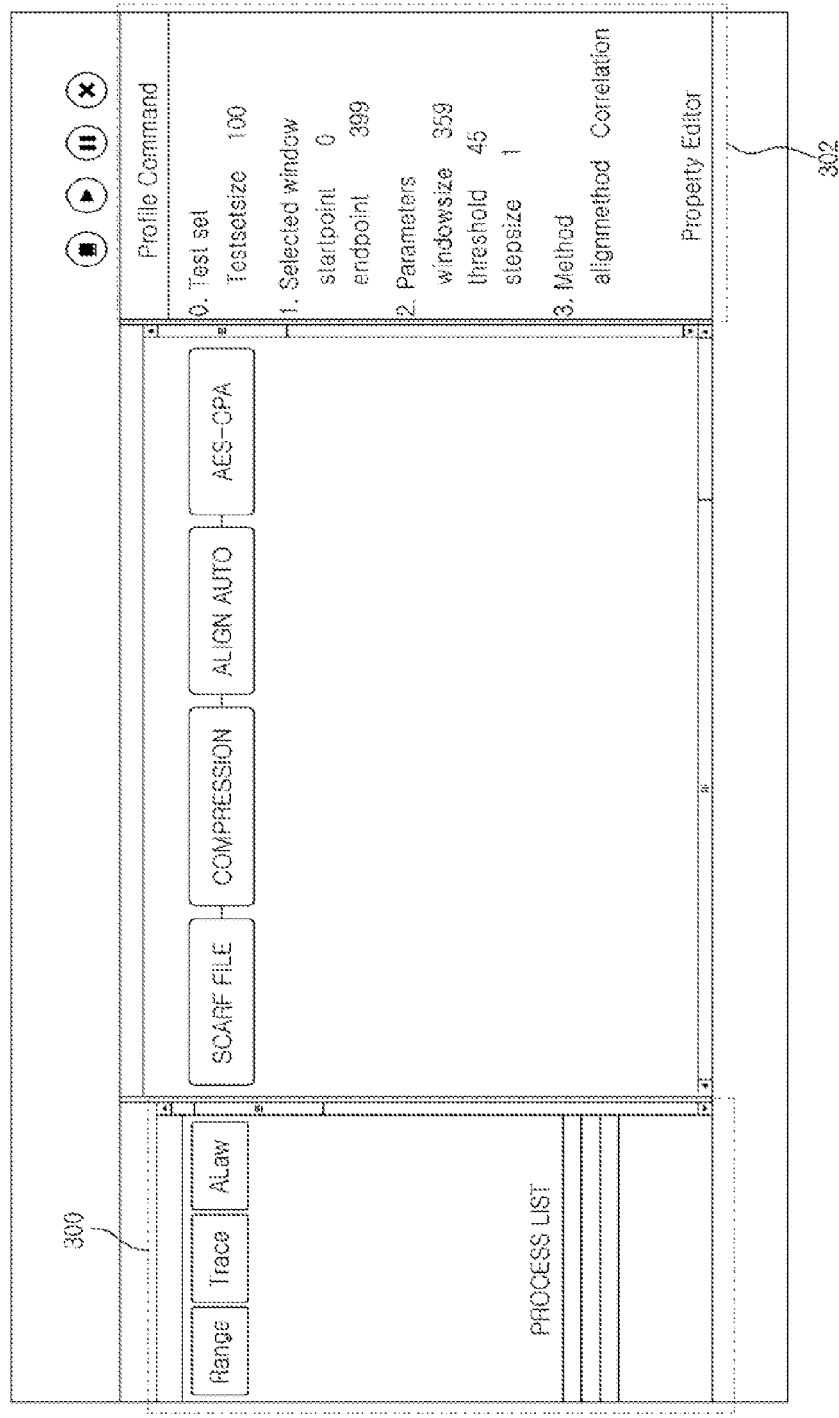
FIG. 3 is an exemplary diagram showing a profile list and a parameter in accordance with the embodiment of the present invention.
Figure 4:
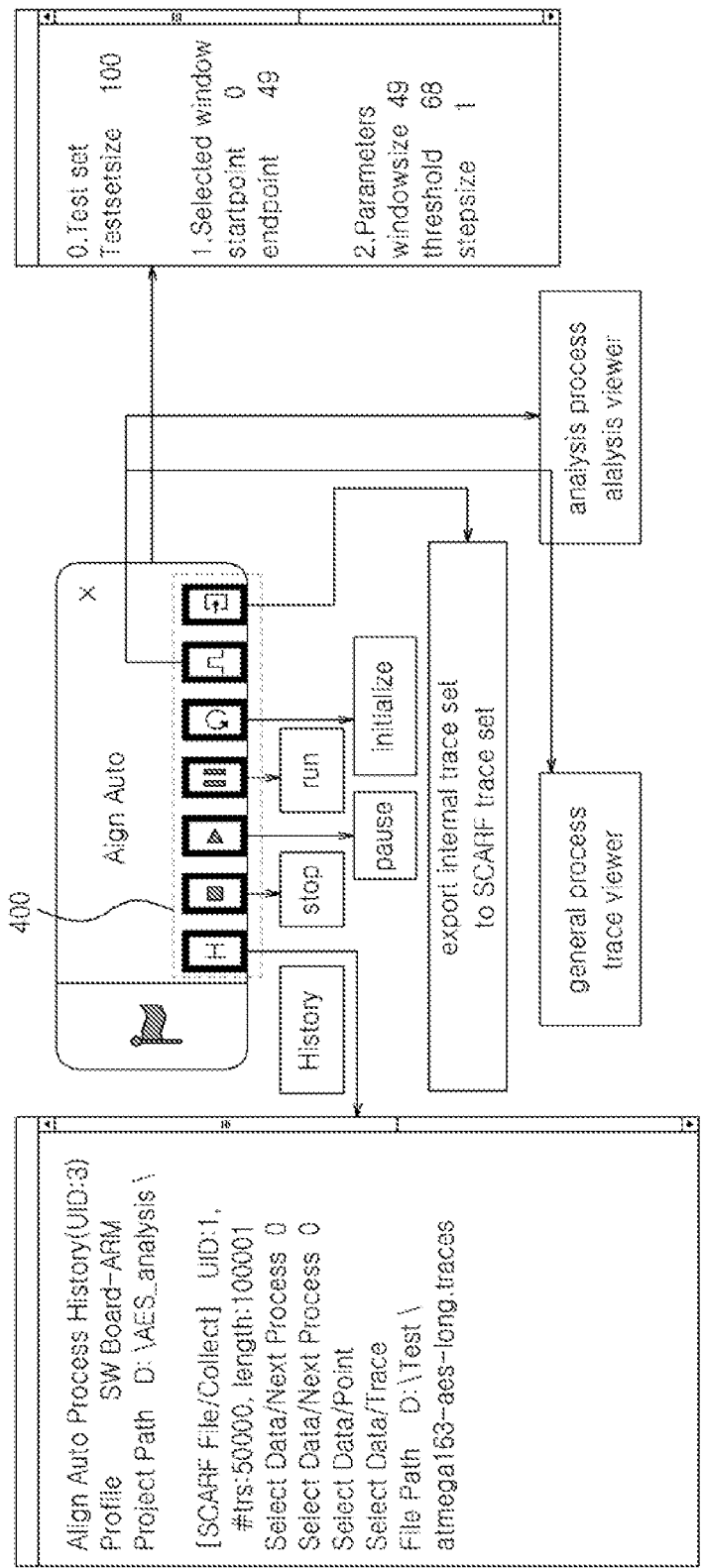
FIG. 4 is an exemplary diagram showing composition of process and commands in accordance with the embodiment of the present invention.

Further, each process may be individually operated by command icons 400 included under a process as shown in FIG. 4, and all processes included in the profile may be simultaneously operated by profile command in FIG. 3.

As shown in FIGS. 2 and 3, in analyzing one analysis device, one profile is made, connections between processes of collecting a waveform, processes of preprocessing and analyzing may be clearly seen, and if each process is selected, parameters of the selected process appear in the property window thus may be easily seen. Further, since the result waveform of each process (a waveform collection process and a preprocessing process) or the result of analysis is easily seen, know-how of analysis may be easily instructed although the profile is not one's own profile but an instructed profile because.

Figure 5:
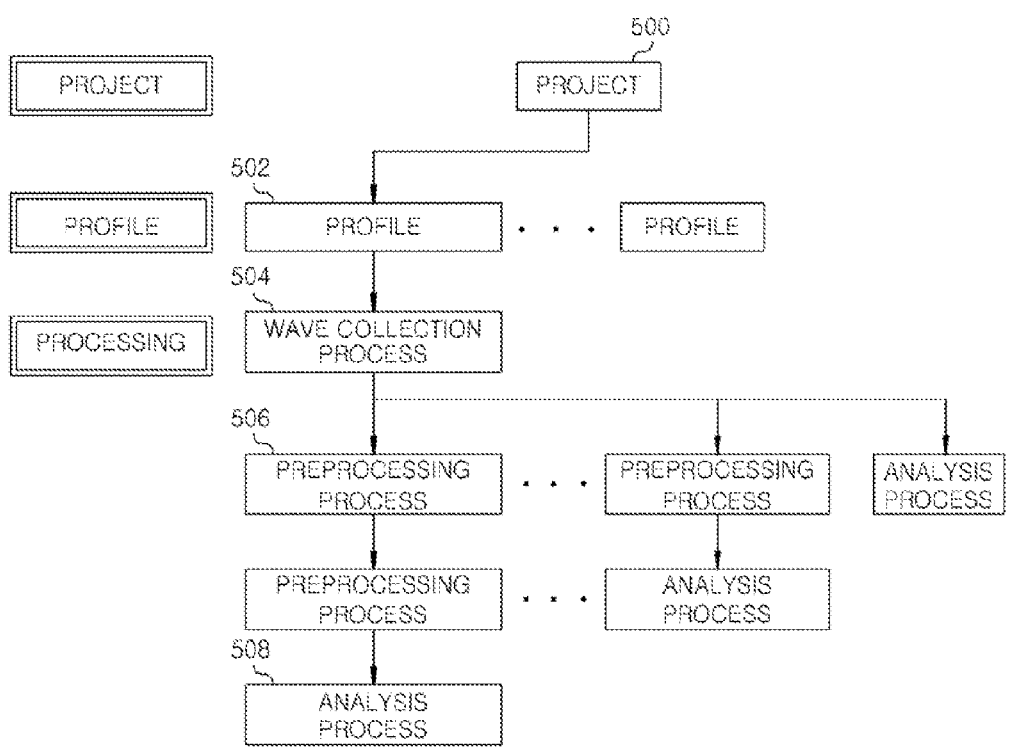
FIG. 5 is a diagram showing a structure of a profile in accordance with the embodiment of the present invention.

FIG. 5 is a diagram showing a structure of a profile in accordance with the embodiment of the present invention.

As shown in FIG. 5, a project 500 about the side channel analysis exists at the top level, and a plurality of profiles 502 are included in the project 500.

Further, a waveform collection process 504, a preprocessing process 506, and an analysis process 508 exist in a lower level of each profile 502.

Therefore, the result waveform of each process (the waveform collection process and the preprocessing process) or the result of analysis may be easily understood and, know-how of the analysis may be easily instructed although the profile is not one's own profile but an instructed profile.

As described above, if an analysis method for the side channel analysis of one apparatus to be analyzed is instructed to a side channel certification authority by making a profile, each side channel certification authority may easily understand the method for the side channel analysis of the device through the profile. At this time, if the profile is initialized, the result waveform of each process is reset. Thereafter, if the profile is driven by connecting the waveform collection device with the device to be analyzed, the same result as that of the instructed certification authority may be obtained. Therefore, know-how of the analysis may be easily instructed.

Further, it is possible to make all processes of a side channel analysis of collecting, preprocessing, analyzing a waveform and the like easily understood through referring to the profile by making each process of the side channel analysis into a process through collecting, preprocessing, and analyzing a waveform in a side channel analysis system, making a profile for managing each process by connection of each process, thus enabling a parameter used in each process and each waveform of operation result of each process to be easily confirmed.

While the invention has been shown and described with respect to the embodiments, the present invention is not limited thereto. It will be understood by those skilled in the art that various changes and modifications may be made without departing from the scope of the invention as defined in the following claims.

What is claimed is:

1. A side channel analysis apparatus based on a profile, comprising:
   a waveform collection unit configured to collect leaked information from a target device of a side channel analysis;
   a preprocessing unit configured to preprocess waveform data corresponding to the leaked information collected by the waveform collection unit before analyzing the waveform data;
   an analysis unit configured to analyze the waveform data preprocessed in the preprocessing unit; and
   a profile configuration unit configured to make each process of the waveform collection unit, the preprocessing unit, and the analysis unit into a process to make a profile for managing each process by connection of each process.

2. The side channel analysis apparatus of claim 1, wherein the profile configuration unit makes a side channel analysis task about the target device of the side channel analysis into one project, makes a plurality of profiles in a lower level of the project, and makes a waveform collection process, preprocessing processes, and analysis processes in a lower level of each process to connect each other.

3. The side channel analysis apparatus of claim 1, wherein the profile configuration unit displays parameters used in each process, and drives each process by the parameters.

4. The side channel analysis apparatus of claim 3, wherein the process receives a waveform of a previous process to generate a new waveform, and inputs the new generated waveform to a subsequent process.

* * * * *